(12) United States Patent
Moen et al.

(10) Patent No.: US 10,801,179 B2
(45) Date of Patent: Oct. 13, 2020

(54) HYDRAULIC FLUID STORAGE TANK INCLUDING QUICK CONNECT COUPLING

(71) Applicant: CNH Industrial America LLC, New Holland, PA (US)

(72) Inventors: Richard A. Moen, Glenwood, MN (US); William A. Roach, Lake Lillian, MN (US)

(73) Assignee: CNH Industrial America LLC, New Holland, PA (US)

( * ) Notice: Subject to any disclaimer, the term of this patent is extended or adjusted under 35 U.S.C. 154(b) by 87 days.

(21) Appl. No.: 15/843,711

(22) Filed: Dec. 15, 2017

(65) Prior Publication Data
US 2019/0186103 A1 Jun. 20, 2019

(51) Int. Cl.
| | |
|---|---|
| *E02F 9/08* | (2006.01) |
| *E02F 9/22* | (2006.01) |
| *B60K 15/067* | (2006.01) |
| *A01B 63/10* | (2006.01) |
| *A01M 7/00* | (2006.01) |

(52) U.S. Cl.
CPC .......... *E02F 9/0883* (2013.01); *E02F 9/2264* (2013.01); *A01B 63/1006* (2013.01); *A01M 7/0082* (2013.01); *B60K 15/067* (2013.01)

(58) Field of Classification Search
CPC ..... E02F 9/0883; E02F 9/2264; E02F 9/2271; E02F 9/22; A01B 63/1006; B60K 15/067; B60K 15/063; B60K 15/03006; B60K 15/03; B60K 15/04; B65D 11/08; B65D 25/48; B65D 83/28; B65D 51/1644; B65D 51/1661; B65D 51/16; F16K 24/04; F16K 24/02
USPC .............. 220/563, 562, 564, 86.1, 601, 661, 220/203.29, 203.27, 203.19, 554, 553; 222/568, 567, 566; 138/39, 40, 37
See application file for complete search history.

(56) References Cited

U.S. PATENT DOCUMENTS

| | | | | |
|---|---|---|---|---|
| 761,548 | A * | 5/1904 | Sheaff ................... | B65D 83/38 |
| | | | | 222/394 |
| 1,616,008 | A * | 2/1927 | Stout ...................... | B64D 37/02 |
| | | | | 220/563 |
| 2,600,876 | A | 6/1952 | Jauch et al. | |
| 2,628,741 | A * | 2/1953 | Wilds ..................... | B63B 11/04 |
| | | | | 220/86.1 |
| 3,298,560 | A * | 1/1967 | Anderson ............. | B29D 22/00 |
| | | | | 220/567.1 |

(Continued)

FOREIGN PATENT DOCUMENTS

| | | | | |
|---|---|---|---|---|
| CN | 203516235 | | 4/2014 | |
| DE | 102011112576 | A1 * | 3/2013 | ........... F16K 15/147 |

*Primary Examiner* — Robert J Hicks
(74) *Attorney, Agent, or Firm* — Rebecca L. Henkel; Rickard K. DeMille

(57) ABSTRACT

A storage system for storing hydraulic fluid used to drive hydraulically driven components of an agricultural implement and of filling the same are provided. The storage system includes a tank having an underside. The tank has a cavity in an interior thereof for receiving the hydraulic fluid therein. A quick connect coupling is operatively connected to the underside of the tank and has an output end in communication with the cavity in the tank and an input end connectable to a hydraulic fluid source. The quick connect coupling is configured to allow for flow from the input end to the output end thereof.

13 Claims, 6 Drawing Sheets

(56) References Cited

U.S. PATENT DOCUMENTS

| | | | | |
|---|---|---|---|---|
| 3,692,051 A * | 9/1972 | Eyb | ................ | B60K 15/03 |
| | | | | 137/544 |
| 4,006,761 A | 2/1977 | Bonafous | | |
| 4,268,156 A | 5/1981 | Kostiner | | |
| 4,488,701 A | 12/1984 | Leigh-Monstevens | | |
| 4,881,581 A | 11/1989 | Hollerback | | |
| 5,083,433 A | 1/1992 | Leigh-Monstevens | | |
| 5,141,013 A | 8/1992 | Zink et al. | | |
| 5,641,003 A | 6/1997 | Rey et al. | | |
| 5,740,846 A | 4/1998 | Larson et al. | | |
| 6,302,167 B1 | 10/2001 | Hollub | | |
| 6,732,774 B1 | 5/2004 | Seckel | | |
| 7,565,986 B2 * | 7/2009 | Brandner | ............ | B29C 49/22 |
| | | | | 220/562 |
| 2003/0010196 A1 * | 1/2003 | Smith | ............ | B62D 49/02 |
| | | | | 91/536 |
| 2008/0236847 A1 | 10/2008 | Sanchez et al. | | |
| 2010/0072200 A1 * | 3/2010 | Marquardt | ............ | B60K 15/04 |
| | | | | 220/86.2 |
| 2015/0022334 A1 | 1/2015 | Guillory et al. | | |
| 2015/0059709 A1 * | 3/2015 | Oohashi | ............ | B60K 15/03 |
| | | | | 123/509 |
| 2015/0276114 A1 * | 10/2015 | Bishop, Jr. | ............ | F16L 55/00 |
| | | | | 285/45 |
| 2016/0176278 A1 | 6/2016 | Bletscher et al. | | |

\* cited by examiner

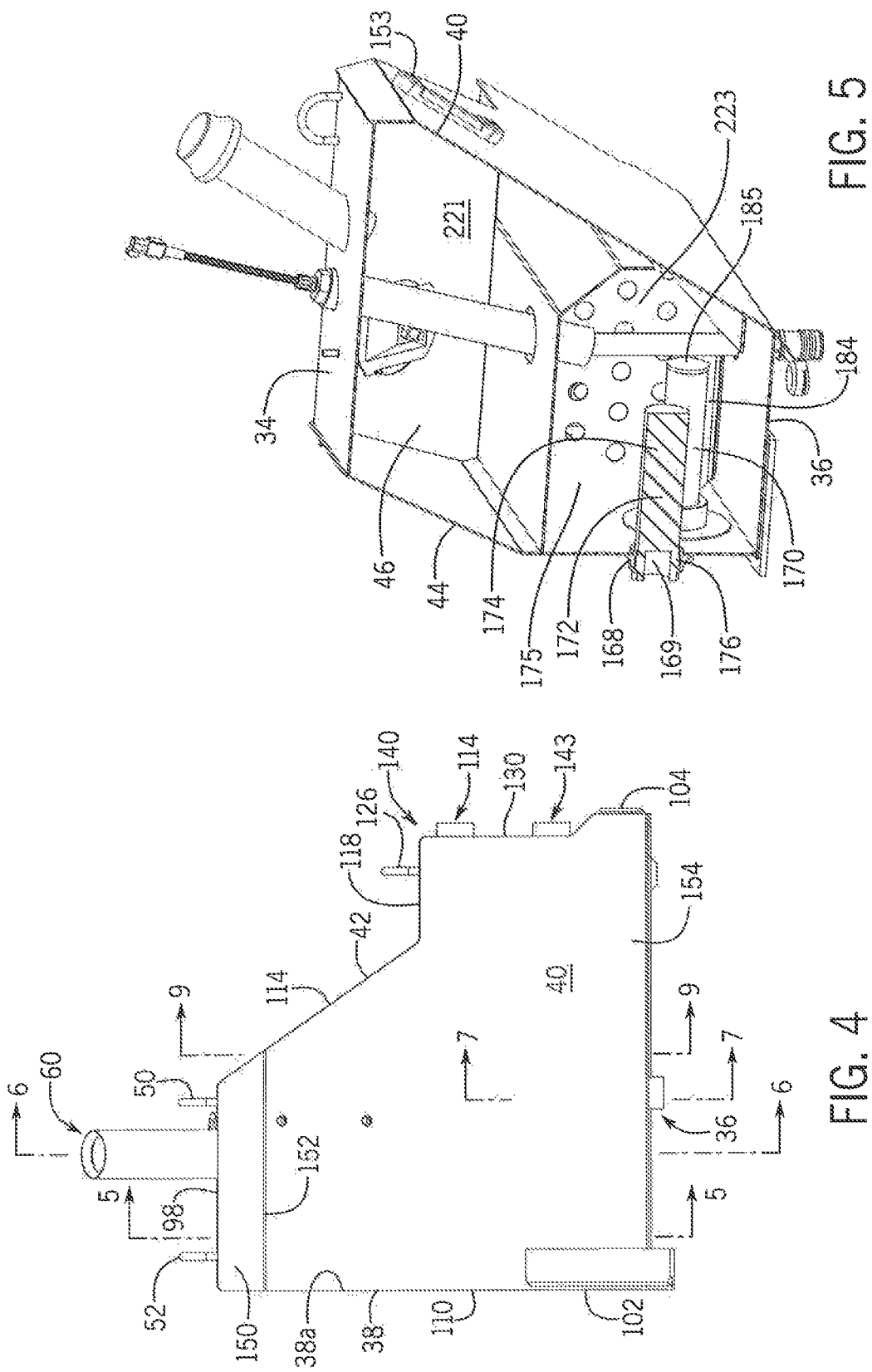

HYDRAULIC FLUID STORAGE TANK INCLUDING QUICK CONNECT COUPLING

FIELD OF THE INVENTION

This invention relates generally to hydraulic drive systems for agricultural implements, and in particular, to a hydraulic fluid storage tank for a hydraulic drive system of an agricultural implement that includes a quick connect coupling for facilitating the filling of the hydraulic fluid storage tank by a user.

BACKGROUND AND SUMMARY OF THE INVENTION

Agricultural implements, such as agricultural chemical sprayers, often include one or more extendable booms configured to spray liquid treatment materials onto established crops. Typically, agricultural chemical sprayers are towed by a tractor or other vehicle, or are constructed as a dedicated, self-propelled sprayer vehicle. Such sprayers, whether towed or self-powered, commonly include a tank or reservoir supported by a frame of the underlying vehicle and a pump system configured to communicate the liquid treatment materials to the respective booms for spraying.

As is conventional, an agricultural chemical sprayer requires a hydraulic power system configured to provide pressurized hydraulic fluid flow to drive the various hydraulically driven components of the sprayer (e.g., the driving and steering system, the cylinders controlling the one or more extendable booms, etc.) associated with the operation thereof. The hydraulic drive system includes a hydraulic reservoir or fluid storage tank to provide fluid storage for the system. The hydraulic fluid storage tank is operatively connected to various conduits which are configured to convey the hydraulic fluid between various hydraulic-driven components and the hydraulic fluid storage tank.

It can be appreciated that the level of hydraulic fluid in the storage tank must be maintained for proper performance of the various hydraulic driven components of the sprayer and to prevent the premature malfunction thereof.

As noted above, it is intended for an agricultural chemical sprayer to spray liquid treatment materials onto established crops. Hence, the frame of the agricultural chemical sprayers must provide adequate ground clearance to prevent damage to the crops during the application of the liquid treatment materials. As such, the hydraulic fluid storage tank of the agricultural chemical sprayers is often mounted at the top of the frame. Further, the fill spout of the hydraulic fluid storage tank is often provided at the top of the tank. Consequently, given the position of the hydraulic fluid storage tank on the frame and the height of this fill spout, it is not possible for an operator to fill the hydraulic fluid storage tank with fluid while standing on the ground, thereby necessitating the use of a ladder by the operator. This process increases the time associated with maintenance of the agricultural chemical sprayer which, in turn, increases the costs and decreases the efficiency associated with operation of the agricultural chemical sprayer.

Therefore, it is a primary object and feature of the present invention to provide a hydraulic fluid storage tank for a hydraulic drive system of an agricultural implement that simplifies the process associated with filing the storage tank with hydraulic fluid.

It is a further object and feature of the present invention to provide a hydraulic fluid storage tank for a hydraulic drive system of an agricultural implement that includes a quick connect coupling for facilitating the filling of the hydraulic fluid storage tank by a user.

It is a still further object and feature of the present invention to provide a hydraulic fluid storage tank for a hydraulic drive system of an agricultural implement that is simple to fill and inexpensive to manufacture.

In accordance with the present invention, a storage tank is provided for storing hydraulic fluid used to power hydraulically driven components of an agricultural implement. The storage tank includes an upper wall, a lower wall and a plurality of side walls interconnecting the upper and lower walls. The upper, lower and side walls define a cavity for receiving the hydraulic fluid therein. A quick connect coupling has an output end communicating with the second end of the passageway of the spout and an input end connectable to a hydraulic fluid source. The quick connect coupling is configured to allow for flow from the input end to the output end thereof.

A baffle is disposed within the cavity and divides the cavity into first and second portions. The baffle is configured to reduce flow of hydraulic fluid between first and second portions during transport of the agricultural implement. The storage tank further includes a tubular, hydraulic fluid receiving spout extending through the upper wall. The spout defines a passageway having a first end communicating with the cavity and a second end communicating with an environment outside of the storage tank. An end cap is receivable on the second spout for selectively closing off the first end of the passageway of the spout.

A suction screen defines a passageway having a first end communicating with cavity and a second end communicating with an environment outside of the storage tank. The suction screen is one of a plurality of defining a generally tubular outlet tubes. Each of the plurality of suction screens defines a passageway having a first end communicating with cavity and a second end communicating with an environment outside of the storage tank. A cleanout cover is positioned in an aperture through one of the side walls of the plurality of side walls. The cleanout cover may be a first cleanout cover and a second cleanout cover may be positioned in a second aperture through the one of the side walls of the plurality of side walls.

In accordance with a further aspect of the present invention, a storage system is provided for storing hydraulic fluid used to drive hydraulically driven components of an agricultural implement. The storage system includes a tank having an underside. The tank has a cavity in an interior thereof for receiving the hydraulic fluid therein. A quick connect coupling is operatively connected to the underside of the tank and has an output end in communication with the cavity in the tank and an input end connectable to a hydraulic fluid source. The quick connect coupling is configured to allow for the flow from the input end to the output end thereof.

The tank includes an upper wall, a lower wall and a plurality of side walls interconnecting the upper and lower walls. The lower wall at least partially defines the underside of the tank. A tubular, hydraulic fluid receiving spout defines a passageway therethough. The passageway has a first end communicating with the cavity in the tank and a second end communicating with the output end of the quick connect coupling. A baffle is disposed within the cavity and divides the cavity into first and second portions. The baffle is configured to reduce flow of hydraulic fluid between first and second portions during transport of the agricultural implement.

A tubular, hydraulic fluid receiving spout extends through the tank. The spout defines a passageway having a first end communicating with the cavity and a second end communicating with an environment outside of the storage tank. The storage system includes at least one suction screen. The at least one suction screen defines a passageway having a first end communicating with cavity and a second end communicating with an environment outside of the tank. At least one cleanout cover is positioned within a corresponding aperture in the tank.

In accordance with a still further aspect of the present invention, a method of filling a storage tank with hydraulic fluid used to drive hydraulically driven components of an agricultural implement is provided. The method includes the steps of operatively connecting a quick connect coupling to an underside of the storage tank. The quick connect coupling has a output end in communication with an interior of the storage tank and an input end. The input end of the quick connect coupling is connected to a hydraulic fluid source and hydraulic fluid is pumped from the hydraulic fluid source to the input end of the quick connect coupling under pressure. The quick connect coupling is configured to allow for the hydraulic fluid received at the input end of the quick connect coupling to flow from the input end to the output end.

The tank includes an upper wall, a lower wall and a plurality of side walls interconnecting the upper and lower walls. The lower wall at least partially defines the underside of the tank. A baffle is disposed within the interior of the storage tank so as to divide the interior of the storage tank into first and second portions. The baffle is configured to reduce flow of hydraulic fluid between first and second portions during transport of the agricultural implement. A tubular, hydraulic fluid receiving spout extends through the storage tank. The spout defines a passageway having a first end communicating with the interior of the storage tank and a second end communicating with an environment outside of the storage tank. The interior of the storage tank is operatively connected to the input of a pump.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 4 is a side elevational view of the hydraulic fluid storage tank of the present invention;

FIG. 5 is a cross-sectional view of the hydraulic fluid storage tank of the present invention taken along line 5-5 of FIG. 4;

DETAILED DESCRIPTION OF THE DRAWINGS

Figure 1:
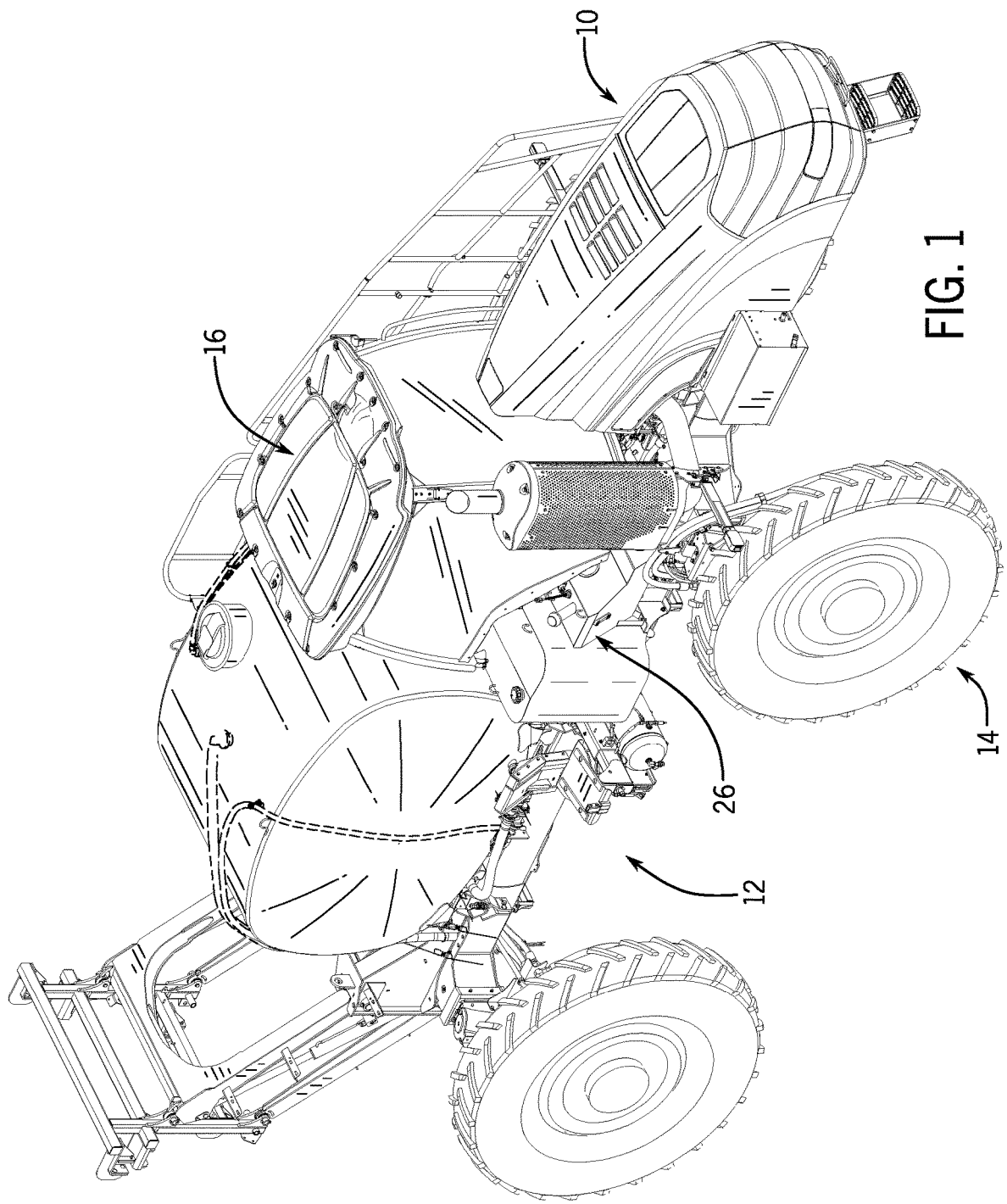
FIG. 1 is side elevational view of a tractor incorporating a hydraulic fluid storage tank in accordance with present invention.

Referring now to the drawings and specifically to FIG. 1, an exemplary self-propelled, agricultural chemical sprayer is generally designated by the reference numeral 10. It is intended for sprayer 10 to be a high-clearance crop vehicle, wherein the term "high-clearance" means a vehicle that is configured to traverse establish crops, particularly more vertically oriented crops such as corn, etc., with negligible interaction between the established crop and the chassis, frame members such as axles, and wheels of the underlying vehicle. Such vehicles provide a vertical cross-sectional shape wherein the vehicle can traverse established vegetation, such as corn of other premature crop materials, as well as, vegetables or other mature and premature lower growing crops, without interfering with or destroying the desired structures of the plant or crop.

Although some crop materials can tolerate limited interaction with a passing vehicle, the high-clearance vehicle is constructed to allow passage of the vehicle over most established vegetation without adversely impacting the health or productivity of the vegetation. It is appreciated that many agricultural vehicles that are not provided in a high-clearance configuration provide adequate clearance for immature and lower growing vegetation but that many such vehicles increase the potential of driving down established crops. Further, for established and more vertically oriented crop materials, such as corn or the like, use of more conventional clearance vehicles post only early crop growth stages, would interfere with the desired treatment of the established crop materials and risk unnecessary damage to the underlying crop materials.

Sprayer 10 includes a chassis or frame 12 having one or more tires or wheels 14 associated therewith. Each of wheels 14 rotate about a respective generally horizontal axis and one or more of wheels 14 is turnable about a generally vertical axis to effectuate turning or changing the direction of travel of sprayer 10. It is appreciated that changes to the direction of travel of sprayer 10 can be effectuated in a number of manners including manually and/or automatically if sprayer 10 is equipped with such remote control or automatic operation methodologies.

As is conventional, sprayer 10 includes an operator area or cab 16 supported on frame 12 and a power plant or engine (not shown) supported on frame 12 forwardly of cab 16. Sprayer 10 may include one or more extendable booms (not shown) configured to spray liquid treatment materials on desired crops in an agricultural field, a tank or reservoir for housing liquid treatment materials to be sprayed, and a pump system configured to communicate the liquid treatment materials to the respective booms for spraying.

Figure 2:
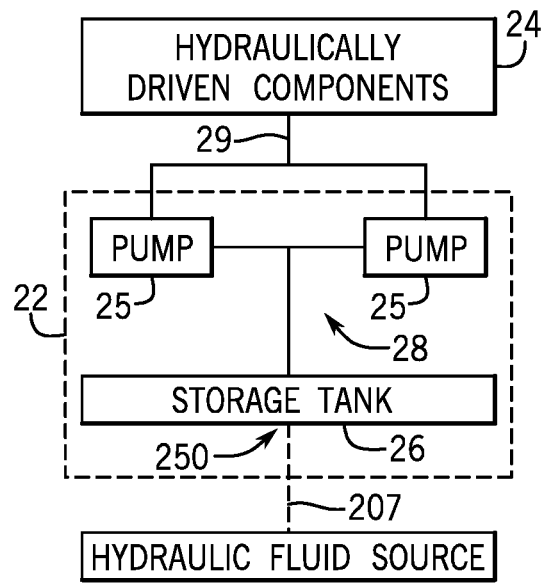
FIG. 2 is a schematic view of a hydraulic drive system incorporating the hydraulic fluid storage tank of the present invention.
Figure 3:
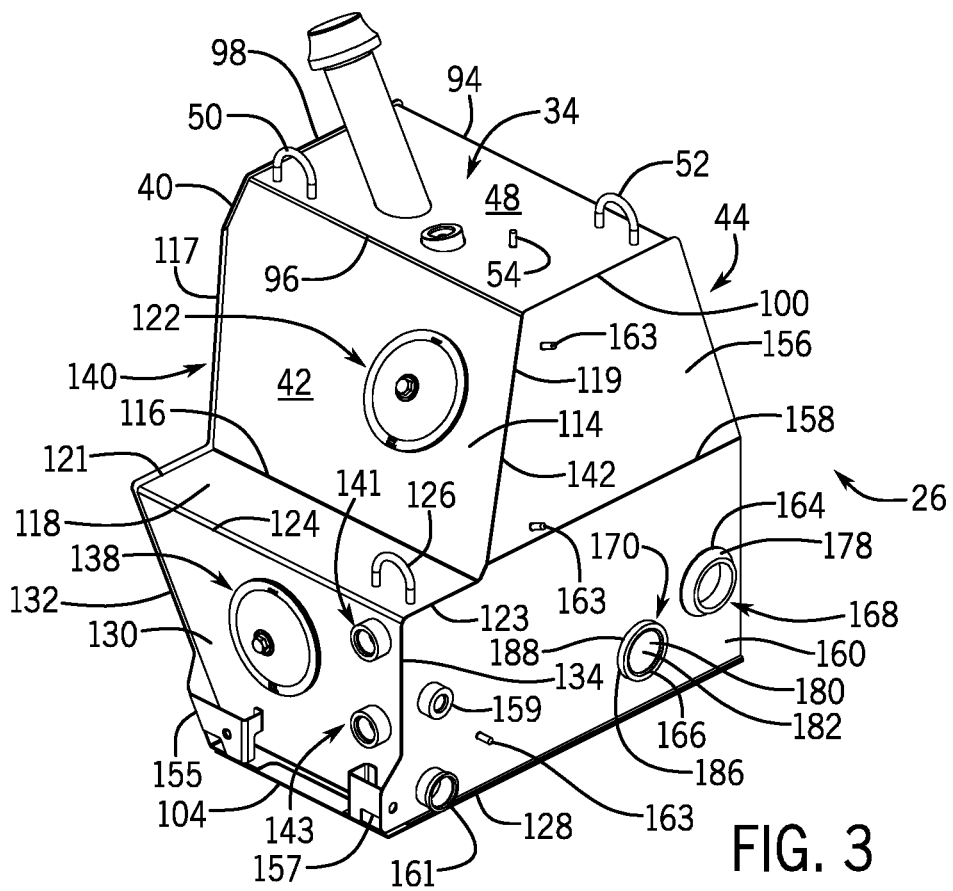
FIG. 3 is an isometric view of the hydraulic fluid storage tank of the present invention.
Figure 6:
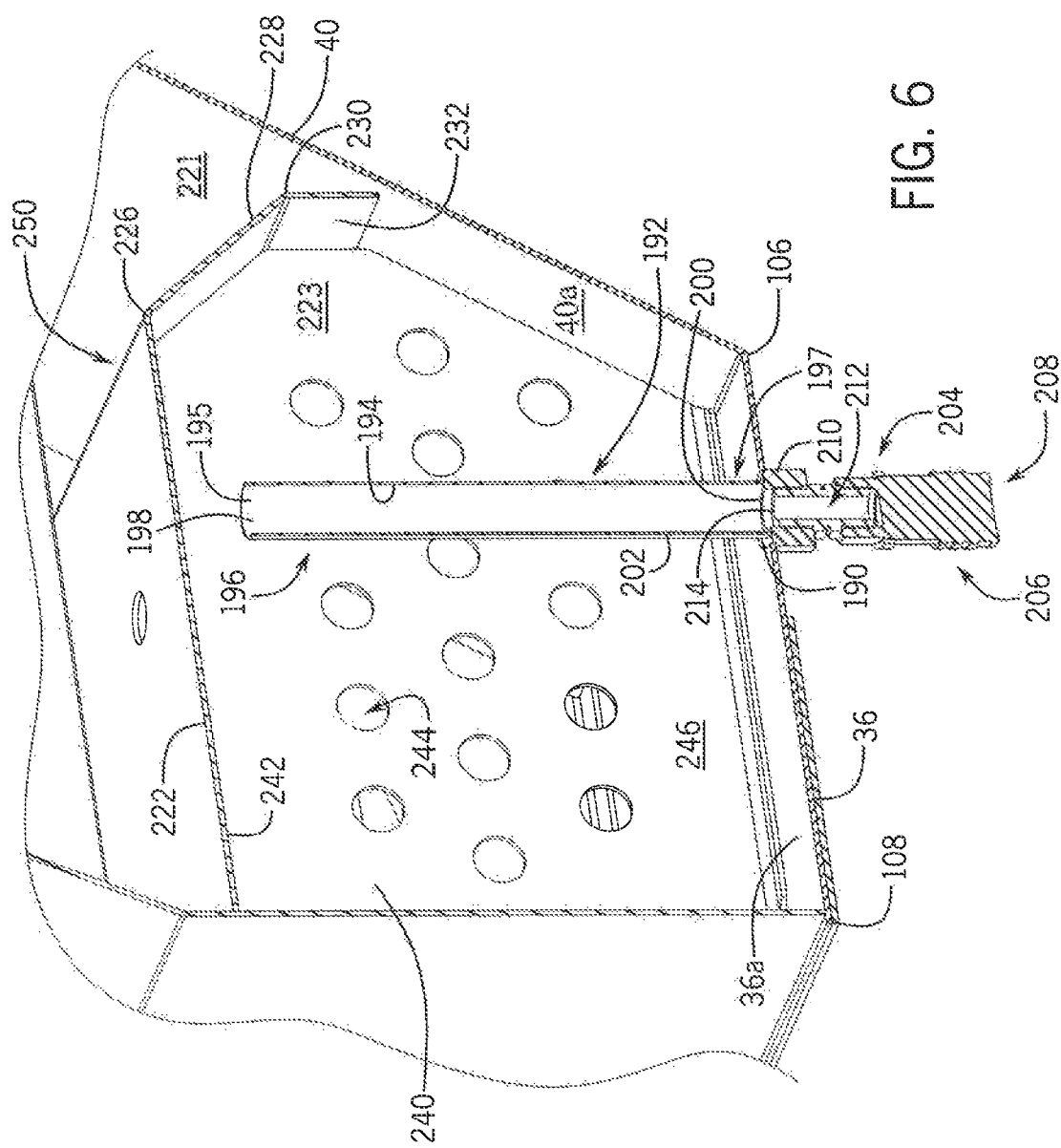
FIG. 6 is a cross-sectional view of the hydraulic fluid storage tank of the present invention taken along line 6-6 of FIG. 4.
Figure 7:
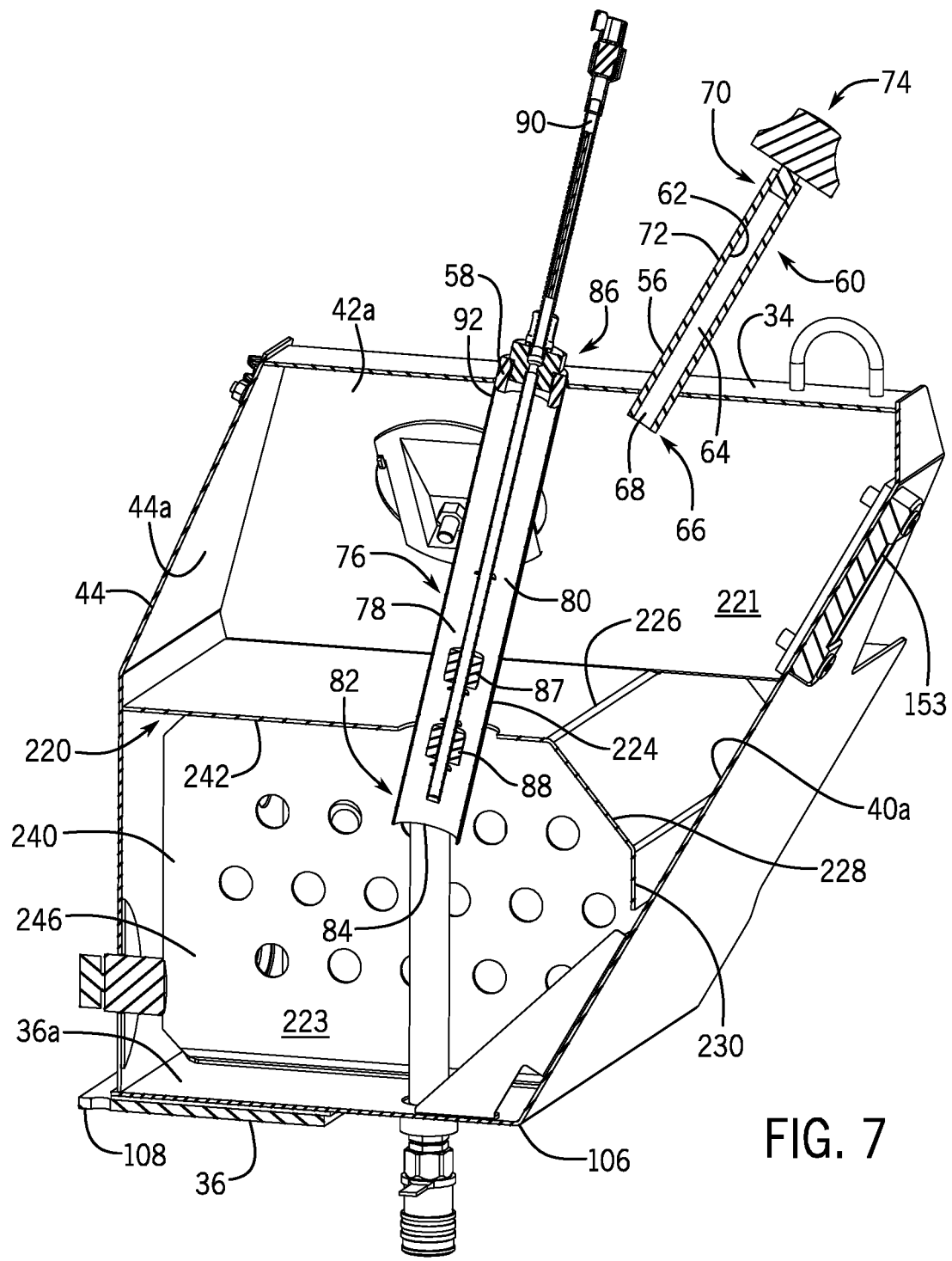
FIG. 7 is a cross-sectional view of the hydraulic fluid storage tank of the present invention taken along line 7-7 of FIG. 4.

Referring to FIG. 2, the agricultural chemical sprayer 10 further includes hydraulic drive system 22 configured to provide pressurized hydraulic fluid flow via pumps 25 to drive the various hydraulically driven components 24 of the sprayer (e.g., the steering system, the cylinders controlling the one or more extendable booms, etc.) associated with the operation thereof. Hydraulic drive system 22 includes hydraulic fluid storage tank 26 fluidically coupled to the one of more pumps 25 in any conventional manner, such as by one or more conduits, collectively depicted as line 28. The one or more pumps 25 are, in turn, fluidically coupled to the hydraulically driven components 24 in any conventional manner, such as by one or more conduits, collectively depicted as line 29. As best seen in FIG. 1, storage tank 26 is operatively connected to frame 12 at a location adjacent cab 16 in any conventional manner such as by welding, bolts or the like.

Referring to FIG. 3-9 storage tank 26 includes a generally flat, upper wall 34 and generally flat lower wall 36 interconnected by side walls 38, 40, 42 and 44. Inner surfaces 38a, 40a, 42a and 44a of side walls 38, 40, 42 and 44, respectively, define cavity 46 within the interior of storage tank 26, as hereinafter described. Outer surface 48 of upper wall 34 includes first and second generally U-shaped lifting hooks 50 and 52, respectively, projecting therefrom. Terminal ends 50a and 50b of lifting hook 50 and terminal ends 52a and 52b of lifting hook 52 are interconnected to outer surface 48 of upper wall 34 by means of welding of the like. It is intended for lifting hooks 50 and 52 to facilitate the positioning and mounting of storage tank 26 to frame 12, as heretofore described. Weld stud 54 projects axially from outer surface 48 of upper wall 34 to allow for a wire harness (not shown) to be secured thereto.

Upper wall 34 further includes first and second apertures 56 and 58, respectively, therein. First aperture 56 in upper wall 34 is adapted for receiving hydraulic fluid receiving spout 60 therethrough. Spout 60 is generally tubular in structure and includes an inner surface 62 defining passageway 64. Spout 60 has a first end 66 received within cavity 46 within the interior of storage tank 26 such that a first end 68 of passageway 64 communicates with cavity 46 and a second end 70 external of storage tank 26. Outer surface 72 of spout 60 is fixed to upper wall 34 about first aperture 56 such as by welding or the like. It is contemplated to fix spout 60 to upper wall 34 such that passageway 64 through spout 60 extends along an axis at an acute angle to outer surface 48 of upper wall 34. End cap 74 is removeably positionable about second end 70 of spout 60 in a conventional manner to prevent unintended materials from entering cavity 46 in storage tank 26 through passageway 64 of spout 60. In addition, end cap 74 also acts as a breather to limit air pressure fluctuations in storage tank 26 due to effects that change the volume of hydraulic fluid therein (e.g., thermal expansion/contraction, cylinder extension/retraction, etc.).

Second aperture 58 in upper wall 34 is adapted for temperature and fluid level sender 76 therethrough. Sender 76 is generally tubular in structure and includes an inner surface 78 defining passageway 80. Sender 76 has a first end 82 received within cavity 46 within the interior of storage tank 26 such that a first end 84 of passageway 80 communicates with cavity 46 and a second end 86 external of storage tank 26. Temperature sender 87 and fluid level sender 88 are positioned within passageway 80 adjacent first end 84 thereof and operatively connected to corresponding indicator unit[s] (not shown) within cab 16 of sprayer 10 by line 90 passing through second end 86 of sender 76. As is conventional, the indicator unit[s] (not shown) within cab 16 of sprayer 10 measure and display the temperature and the fluid level in cavity 46 in storage tank 26. Outer surface 92 of sender 76 is fixed to upper wall 34 about second aperture 58 such as by welding or the like. It is contemplated to fix sender 76 to upper wall 34 such that passageway 80 through sender 76 extends along an axis at an acute angle to outer surface 48 of upper wall 34.

Upper wall 34 is defined by generally parallel, first and second side edges 94 and 96, respectively, interconnected by generally parallel, first and second end edges 98 and 100, respectively. Similarly, lower wall 36 is defined by generally parallel, first and second side edges 102 and 104, respectively, interconnected by generally parallel, first and second end edges 106 and 108, respectively. First side edge 94 of upper wall 34 is interconnected to first side edge 102 of lower wall 36 by side wall 38. Side wall 38 includes first and second sides 110 and (not shown), respectively.

Side wall 42 extends between second side edge 96 of upper wall 34 and second side edge 104 of lower wall 36. Side wall 42 includes an upper portion 114 extending from second side edge 96 of upper wall 34 and diverging from side wall 38. Upper portion 114 includes first and second side edges 117 and 119, respectively, and terminates at a lower edge 116 generally parallel to second side edge 96 of upper wall 34. Aperture 120 extends through upper portion 114 and is adapted for receiving a cleanout cover 122 therein for allowing access to the inside of storage tank 26 for cleaning either during manufacture or field service. Intermediate portion 118 of side wall 42 extends from lower edge 116 of upper portion 114 and includes first and second side edges 121 and 123, respectively. Intermediate portion 118 of side wall 42 lies in a plane generally parallel to upper and lower walls 34 and 36, respectively, and terminates at terminal edge 124. U-shaped lifting hook 126 projects from outer surface 128 of intermediate portion 118 of side wall 42.

Lower portion 130 of side wall 42 extends from terminal edge 124 of intermediate portion 118 and includes first and second side edges 132 and 134, respectively. Lower portion 130 of side wall 42 includes a first aperture 136 extending through lower portion 130 and is adapted for receiving a cleanout cover 138 therein for allowing access to the inside of storage tank 26 for cleaning either during manufacture or field service. In addition, lower portion 130 of side wall 42 further includes first and second ports 141 and 143, respectively, projecting therefrom. First and second ports 141 and 143, respectively, are intended to allow fluid conveyance to and from the tank.

Figure 8:
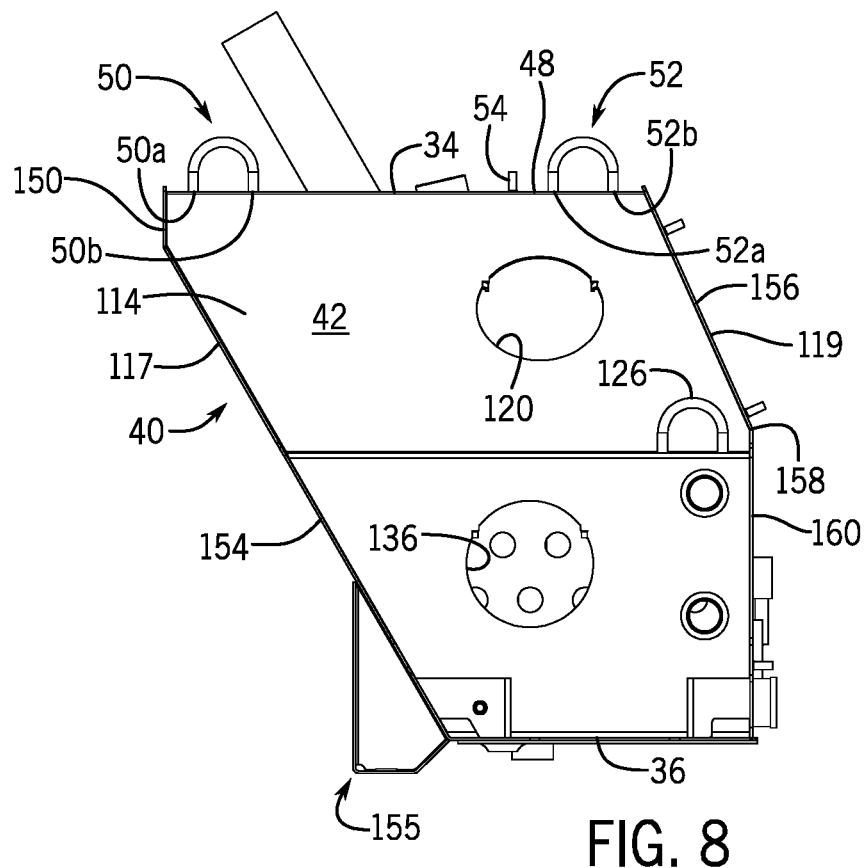
FIG. 8 is a front elevational view of the hydraulic fluid storage tank of the present invention.
Figure 9:
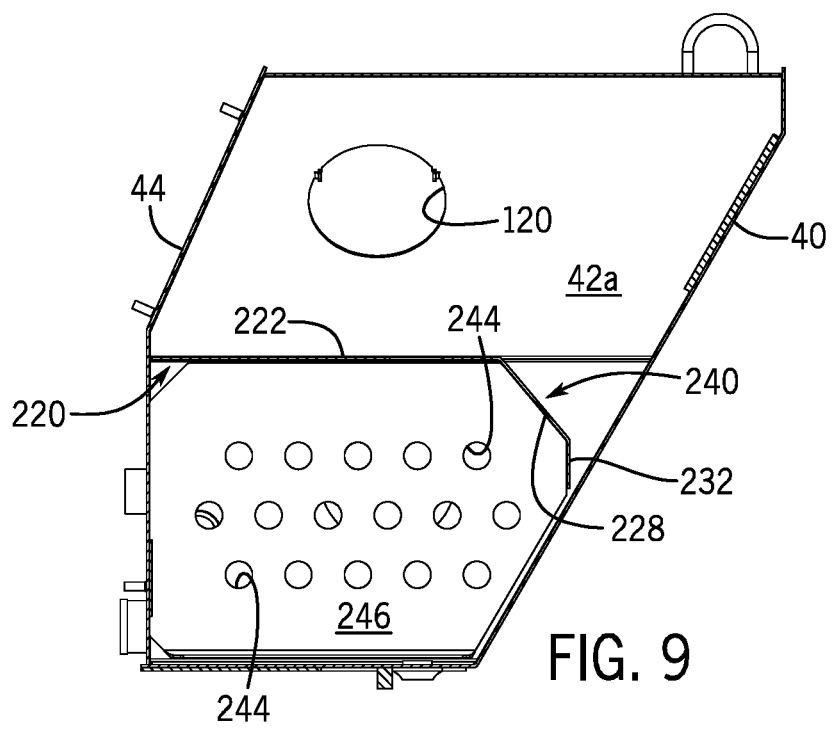
FIG. 9 is a cross-sectional view of the hydraulic fluid storage tank of the present invention taken along line 9-9 of FIG. 4.

First side edges 117, 121, and 132 of upper, intermediate and lower portions 114, 118, and 130, respectively, collectively define first side edge 140 of side wall 42. Similarly, second side edges 119, 123, and 134 of upper, intermediate and lower portions 114, 118, and 130, respectively, collectively define second side edge 142 of side wall 42. Side wall 40 extends between first end edge 98 of upper wall 34 and first end edge 106 of lower wall 36 so as to interconnect upper and lower walls 34 and 36, respectively, as heretofore described. In addition, side wall 40 extends between first side edge 140 of side wall 42 and first side 110 of side wall 38 so as to interconnect side walls 38 and 42. As best seen in FIG. 8, side wall 40 includes an upper portion 150 which is generally perpendicular to upper wall 34 and terminates at terminal end 152 which is generally parallel to first end edge 98 of upper wall 34. Lower portion 154 of side wall 40 extends from terminal end 152 of upper portion 150 of side wall 40 at an acute angle to upper wall 34. Sight level gauge 153 may be provided on side wall 40 to allow a user to visually monitor the hydraulic fluid in cavity 46 with storage tank 26 and mounting bracket 155 may project from side wall 40 to facilitate the mounting of storage tank 26 to frame 12.

Side wall 44 extends between second end edge 100 of upper wall 34 and second end edge 108 of lower wall 36 so as to interconnect upper and lower walls 34 and 36, respectively, as heretofore described. In addition, side wall 44 extends between second side edge 142 of side wall 42 and second side (not shown) of side wall 38 so as to interconnect side walls 38 and 42. Side wall 44 includes an upper portion 156 at an obtuse angle to upper wall 34 and terminates at terminal end 158 which is generally parallel to and is vertically spaced from intermediate portion 118 of side wall 42.

Lower portion 160 of side wall 44 extends from terminal end 158 of upper portion 156 of side wall 44 and is generally perpendicular to upper wall 34. Lower portion 160 of side wall 44 further includes first and second ports 159 and 161, respectively, projecting therefrom. First and second mounting ports 159 and 161, respectively, are intended to allow fluid conveyance to and from the tank. A plurality of weld studs 163 project axially from side wall 44 to allow for a wire harness (not shown) to be secured thereto. In addition, it is contemplated to provide first and second apertures 164 and 166, respectively, through lower portion 160 of side wall 44 to accommodate first and second suction screens 168 and 170, respectively, therethrough. Mounting bracket 157 may project from lower portion 160 of side wall 44 to facilitate the mounting of storage tank 26 to frame 12.

Suction screen 168 is generally tubular in structure and includes an inner surface 169 defining passageway 172. Suction screen 168 has a first end 174 received within cavity 46 within the interior of storage tank 26 such that a first end 175 of passageway 174 communicates with cavity 46 and a second end 176 is external of storage tank 26. Outer surface 178 of suction screen 168 is threaded into first aperture 164 through to side wall 44. It is contemplated to fix suction screen 168 to side wall 44 such that passageway 174 through suction screen 168 extends along an axis generally parallel upper wall 34. Suction screen 168 is operatively connectable to a corresponding pump 25 providing pressurized hydraulic fluid flow to drive various hydraulically driven components of the sprayer (e.g., the steering system, the cylinders controlling the one or more extendable booms, etc.) associated with the operation thereof.

Suction screen 170 is generally tubular in structure and includes an inner surface 180 defining passageway 182. Suction screen 170 has a first end 184 received within cavity 46 within the interior of storage tank 26 such that a first end 185 of passageway 184 communicates with cavity 46 and a second end 186 is external of storage tank 26. Outer surface 188 of suction screen 170 is threaded into second aperture 166 through side wall 44. It is contemplated to fix suction screen 170 to side wall 44 such that passageway 184 through outlet tube 170 extends along an axis generally parallel upper wall 34. Suction screen 170 is operatively connected to a corresponding pump 25 for providing pressurized hydraulic fluid flow to drive various hydraulically driven components of the sprayer (e.g., the steering system, the cylinders controlling the one or more extendable booms, etc.) associated with the operation thereof.

Lower wall 36 includes an aperture 190 therethrough to accommodate hydraulic fluid receiving spout 192. More specifically, spout 192 is generally tubular in structure and includes an inner surface 194 defining passageway 195. Spout 192 has an inner end 196 received within cavity 46 within the interior of storage tank 26 and an outer end 197 such that a first end 198 of passageway 195 communicates with cavity 46 and a second end 200. Outer surface 202 of spout 192 is fixed to lower wall 36 about aperture 190 such as by welding or the like. It is contemplated to fix spout 192 to lower wall 36 such that passageway 195 through spout 192 extends along an axis generally perpendicular to lower wall 36. It is intended for spout 192 to prevent hydraulic fluid from draining out of storage tank 26 in the event of a leak in a quick connect coupling 204, hereinafter described.

Inner end 196 of spout 192 is provided at generally the same vertical level as the fluid level sender 88.

Quick connect coupling 204 is operatively connected to outer end 197 of spout 192. Coupling 204 includes a connector housing 206 having an input end 208 adapted for connecting to a terminal output end of a fill hose 207, FIG. 2, in a mating relationship and an output end 210 coupled to outer end 197 of spout 192. A valve, generally designated by the reference numeral 212, is provided within connector housing 206 between input and output ends 208 and 210, respectively. Valve 212 includes an internal seal 214 movable between a first position wherein seal 214 blocks the flow of fluid therepast and a second position wherein 214 allows fluid to flow through quick connect coupling 204 from input end 208 to output end 210. Valve 212 is biased toward the first position to prevent hydraulic fluid from exiting cavity 46 within the interior of storage tank 26 therepast. It is contemplated for valve 212 to be moved between the first position to the second position in any conventional manner, such as by the connection of the terminal output end of the fill hose 207 to input end 208 of connector housing 206 of coupling 204 or by fluidic pressure, as hereinafter described.

Partition 220 is positioned in cavity 46 within the interior of storage tank 26 between inner surfaces 38*a*, 40*a*, 42*a* and 44*a* of side walls 38, 40, 42 and 44, respectively, so as to divide cavity 46 into an upper portion 221 and a lower portion 223. More specifically, partition 220 includes a first, horizontal portion 222 lying in a plane generally parallel to upper wall 34 and extending between inner surfaces 38*a*, 42*a* and 44*a* of side walls 38, 42 and 44, respectively, at a location vertically spaced from the plane in which intermediate portion 118 of side wall 42 lies. Horizontal portion 222 of partition 220 includes an aperture 224 therethrough for receiving first end 82 of sender 76, FIG. 7, so as to allow temperature sender 86 and fluid level sender 88 to be positioned adjacent inner surface 36*a* of lower wall 36. Horizontal portion 222 of partition 220 terminates at edge 226 extending between inner surface 38*a* of side wall 38 and upper portion 114 of side wall 42. Angled portion 228 of partition 220 depends from edge 226 of horizontal portion 222 and is directed towards side wall 40 between side walls 38 and 42. Angled portion 228 of partition 220 terminates at edge 230. Vertical portion 232 of partition 220 extends between edge 230 of angled portion 228 of partition 220 and inner surface 40*a* of side wall 40. Partition 220 is configured to maintain adequate hydraulic fluid within lower portion 223 of cavity 46, and more specifically, to outlet tubes 168 and 170 when sprayer 10 is driven on a sloped surface.

Baffle 240 extends between lower surface 242 of partition 220 and inner surface 36*a* of lower wall 36 and between inner surface 40*a* of side wall 40 and inner surface 44*a* of side wall 44. Baffle 240 includes a plurality of apertures 244 therethrough and bisects lower portion 223 of cavity 46 into first and second side lower portions 246 and 248, respectively. Baffle 240 is configured to decrease the velocity of hydraulic fluid flow between first and second side lower portions 246 and 248, respectively, of lower portion 223 of cavity 48 within storage tank 26 of sprayer 10, and more specifically, between ports 141, 143, 159 and 161 in second side lower portion 248 and suction ports 168 and 170 in first side lower portion 246, to provide adequate time for air to separate from the hydraulic fluid and to improve mixing and cooling times.

In operation, in order to fill cavity 46 in storage tank 26, a first end 250 of fill hose 207, FIG. 2, is fluidically connected to input end 208 of coupling 204 and a second end 252 is fluidically connected to a hydraulic fluid source 254. Hydraulic fluid source 254 provides hydraulic fluid, under pressure to fill hose 207. As heretofore described, valve 212 is moved from the first position to the second position in any conventional manner, such as by the connection of the terminal output end of the fill hose 207 to input end 208 of connector housing 206 of coupling 204 or by the fluidic pressure of the hydraulic fluid delivered to input end 208 of coupling 204. With valve 212 in the second position, hydraulic fluid is allowed to sequentially flow through valve 212, output end 210 of coupling 204 and into passageway 195 through spout 192. The hydraulic fluid continues to flow through passageway 195 and out of inner end 196 of spout 192 into cavity 46 in storage tank 26 until the hydraulic fluid reaches a desired level within cavity 46 in storage tank 26. Thereafter, first end 250 of fill hose 207 is disconnected from input end 208 of coupling, thereby causing valve 212 to return to the first position wherein valve 212 prevents the hydraulic fluid in cavity 46 of storage tank 26 from exiting cavity 26 through coupling 204. As previously noted, the hydraulic fluid in cavity 46 of storage tank 26 may be used to drive various hydraulically driven components 24 of the sprayer (e.g., the steering system, the cylinders controlling the one or more extendable booms, etc.).

It can be appreciated that the above description of a storage tank is merely exemplary of the present invention. Various modes of carrying out the invention are contemplated as being within the scope of the following claims particularly pointing out and distinctly claiming the subject matter, which is regarded as the invention.

We claim:

1. A storage tank for storing hydraulic fluid used to drive hydraulically driven components of an agricultural implement, the storage tank comprising:
   an upper wall, a lower wall and a plurality of side walls interconnecting the upper and lower walls, the upper, lower and sidewalls defining a cavity for receiving the hydraulic fluid therein;
   a quick connect coupling disposed in the lower wall and having an output end communicating with the cavity and an input end connectable to a hydraulic fluid source;
   a partition disposed in the cavity, the partition including a horizontal section dividing the cavity into an upper portion and a lower portion;
   a baffle disposed within the lower portion of the cavity and dividing the lower portion of the cavity into first and second side portions, the baffle being generally perpendicular to the horizontal section of the partition and being configured to reduce velocity of hydraulic fluid between first and second side portions during transport of the agricultural implement; and
   a unidirectional valve within the quick connect coupling, the valve movable between a first position wherein hydraulic fluid is blocked from flowing from the output end to the input end of the quick connect coupling and a second position wherein hydraulic fluid is allowed to flow from the input end to the output end of the quick connect coupling.

2. The storage tank of claim 1 further comprising a tubular, hydraulic fluid receiving spout extending through the upper wall, the spout defining a passageway having a first end communicating with the cavity and a second end communicating with an environment outside of the storage tank.

3. The storage tank of claim 2 further comprising an end cap receivable on the second end of the spout for selectively closing off the first end of the passageway of the spout.

4. The storage tank of claim 1 further comprising a suction screen defining a passageway having a first end communicating with cavity and a second end communicating with an environment outside of the storage tank.

5. The storage tank of claim 4 wherein the suction screen is one of a plurality of suction screens, each of the suction screens defining a passageway having a first end communicating with cavity and a second end communicating with an environment outside of the storage tank.

6. The storage tank of claim 1 further comprising a cleanout cover positioned in an aperture through one of the side walls of the plurality of side walls.

7. The storage tank of claim 6 wherein the cleanout cover is a cleanout cover and wherein the storage tank further comprises a second cleanout cover positioned in a second aperture through the one of the side walls of the plurality of side walls.

8. A storage system for storing hydraulic fluid used to drive hydraulically driven components of an agricultural implement, comprising:
   a tank having an underside and including a cavity in an interior thereof for receiving the hydraulic fluid therein;
   a partition disposed in the cavity, the partition including a horizontal section dividing the cavity into an upper portion and a lower portion;
   a baffle disposed within the lower portion of the cavity and dividing the lower portion of the cavity into first and second side portions, the baffle being generally perpendicular to the horizontal section of the partition and being configured to reduce velocity of hydraulic fluid between first and second side portions during transport of the agricultural implement;
   a quick connect coupling operatively connected to the underside of the tank and having an output end in communication with the cavity in the tank and an input end connectable to a hydraulic fluid source; and
   a unidirectional valve within the quick connect coupling, the valve movable between a first position wherein hydraulic fluid is blocked from flowing from the output end to the input end of the quick connect coupling and a second position wherein hydraulic fluid is allowed to flow from the input end to the output end of the quick connect coupling.

9. The storage system of claim 8 wherein the tank includes an upper wall, a lower wall and a plurality of side walls interconnecting the upper and lower walls, the lower wall at least partially defining the underside of the tank.

10. The storage system of claim 8 further comprising a tubular, hydraulic fluid receiving spout defining a passageway therethough, the passageway having a first end communicating with the cavity in the tank and a second end communicating with the output end of the quick connect coupling.

11. The storage system of claim 8 further comprising a tubular, hydraulic fluid receiving spout extending through the tank, the spout defining a passageway having a first end communicating with the cavity and a second end communicating with an environment outside of the storage tank.

12. The storage system of claim 8 further comprising at least one suction screen, the at least one suction screen defining a passageway having a first end communicating with cavity and a second end communicating with an environment outside of the tank.

13. The storage system of claim 8 further comprising at least one cleanout cover positioned within a corresponding aperture in the tank.

\* \* \* \* \*